US009144708B2

(12) United States Patent
Selek (10) Patent No.: US 9,144,708 B2
(45) Date of Patent: Sep. 29, 2015

(54) EXERCISE DEVICE

(71) Applicant: Ali Selek, Victoria (AU)

(72) Inventor: Ali Selek, Victoria (AU)

( * ) Notice: Subject to any disclaimer, the term of this patent is extended or adjusted under 35 U.S.C. 154(b) by 162 days.

(21) Appl. No.: 13/692,537

(22) Filed: Dec. 3, 2012

(65) Prior Publication Data

US 2013/0143719 A1 Jun. 6, 2013

(30) Foreign Application Priority Data

Dec. 1, 2011 (AU) .................................. 2011905006

(51) Int. Cl.
*A63B 22/00* (2006.01)
*A63B 23/16* (2006.01)
*A63B 21/015* (2006.01)
*A63B 21/00* (2006.01)
*A63B 23/035* (2006.01)
*A63B 23/04* (2006.01)
*A63B 23/12* (2006.01)
*B62B 5/06* (2006.01)
(Continued)

(52) U.S. Cl.
CPC ............... *A63B 23/16* (2013.01); *A63B 21/015* (2013.01); *A63B 21/1469* (2013.01); *A63B 21/1492* (2013.01); *A63B 23/03541* (2013.01); *A63B 23/047* (2013.01); *A63B 23/1209* (2013.01); *B62B 5/06* (2013.01); *B62B 5/062* (2013.01); *B62B 9/20* (2013.01); *B62B 9/206* (2013.01); *A63B 2071/0658* (2013.01); *A63B 2225/50* (2013.01); *A63B 2230/06* (2013.01); *A63B 2230/30* (2013.01); *A63B 2230/75* (2013.01)

(58) Field of Classification Search
CPC ........... A63B 21/1469; A63B 21/1492; A63B 23/03541; A63B 23/16; A63B 21/015; A63B 23/047; A63B 23/1209; B62B 9/20; B62B 5/06; B62B 5/062; B62B 5/064; B62B 5/066; B62B 9/206
USPC ............... 482/44–46, 49, 51, 57, 62, 74, 114, 482/115, 116, 118, 121, 122, 126–128, 904, 482/905, 139, 148; 16/422, 426; 280/47.25, 280/47.371, 47.38
See application file for complete search history.

(56) References Cited

U.S. PATENT DOCUMENTS

| 4,189,166 A | | 2/1980 | Lindsey | |
| 4,225,104 A | * | 9/1980 | Larson | ........................ 248/125.8 |
| 4,625,963 A | * | 12/1986 | Lancellotti | .................... 482/130 |

(Continued)

FOREIGN PATENT DOCUMENTS

| CA | 2121170 A1 | 10/1994 |
| KR | 10-1005981 B1 | 1/2011 |

OTHER PUBLICATIONS

International-Type Search Report, dated Sep. 6, 2013 from the Australian Patent Office, issued in Australian Application No. 2011905006.

(Continued)

*Primary Examiner* — Stephen Crow
*Assistant Examiner* — Gregory Winter
(74) *Attorney, Agent, or Firm* — Sughrue Mion, PLLC (57) ABSTRACT

An exercise device (20) having a hand graspable movable part (24) mounted to a mounting part (25) for movement with respect to the mounting part. The mounting part (25) is affixable to a hand movable object (12) so that the hand movable object may be moved by a user by hand grasping the movable part (24) while also executing reciprocatory movement of the movable part.

13 Claims, 7 Drawing Sheets

(51) Int. Cl.
*B62B 9/20* (2006.01)
*A63B 71/06* (2006.01)

(56) References Cited

U.S. PATENT DOCUMENTS

| | | | |
|---|---|---|---|
| 4,705,284 A | 11/1987 | Stout | |
| 4,799,668 A | 1/1989 | Jensen | |
| 4,850,585 A | 7/1989 | Dalebout | |
| 5,031,912 A * | 7/1991 | Vaughn et al. | 482/118 |
| 5,054,830 A * | 10/1991 | Nisenbaum | 294/58 |
| 5,674,165 A | 10/1997 | Cohen et al. | |
| 5,785,631 A * | 7/1998 | Heidecke | 482/5 |
| 5,876,309 A | 3/1999 | Archey | |
| 5,878,853 A * | 3/1999 | DeRouen et al. | 190/116 |
| 6,179,752 B1 | 1/2001 | Chang | |
| 6,196,947 B1 | 3/2001 | Anderson | |
| 6,343,822 B1 * | 2/2002 | Badura | 294/58 |
| 6,527,673 B1 * | 3/2003 | Chen | 482/1 |
| 6,722,689 B2 * | 4/2004 | Kreamer | 280/642 |
| 7,077,420 B1 * | 7/2006 | Santoski | 280/642 |
| 7,309,071 B1 | 12/2007 | Michael | |
| 7,328,906 B1 | 2/2008 | Berkovich | |
| 7,344,484 B1 * | 3/2008 | Porcellato | 482/123 |
| 7,798,515 B2 * | 9/2010 | Valdez et al. | 280/647 |
| 8,012,070 B2 | 9/2011 | James et al. | |
| 8,132,825 B1 * | 3/2012 | Choquette et al. | 280/434 |
| 8,172,243 B2 | 5/2012 | Dresher | |
| 8,215,651 B2 * | 7/2012 | Mountz et al. | 280/47.36 |
| 2002/0142898 A1 * | 10/2002 | Willis et al. | 482/130 |
| 2004/0163214 A1 * | 8/2004 | Cheng | 16/426 |
| 2004/0235623 A1 * | 11/2004 | Martinez | 482/94 |
| 2008/0100014 A1 * | 5/2008 | Tripiano | 280/47.371 |
| 2010/0056348 A1 | 3/2010 | James et al. | |

OTHER PUBLICATIONS http://www.lovehandlesinc.com, retrieved Nov. 1, 2013.

* cited by examiner

EXERCISE DEVICE

FIELD OF THE INVENTION

This invention relates to an exercise device.

BACKGROUND OF THE INVENTION

Persons may wish to exercise parts of their body while undertaking activities not usually involving such exercise. For example, a person walking an infant in a pram or stroller may achieve some degree of exercise of the legs, for example, but not so much of the arms.

SUMMARY OF THE INVENTION

In one aspect the invention provides an exercise device having a hand graspable movable part mounted to a mounting part for movement with respect to the mounting part, the mounting part being affixable to a hand movable object so that the hand movable object may be moved by a user by hand grasping the movable part while also executing reciprocatory movement of the movable part.

The invention also provides a hand movable object having an exercise device having a hand graspable movable part movable with respect to the hand movable object so that the hand movable object may be moved by a user by hand grasping the movable part while also executing reciprocatory movement of the movable part.

The hand movable object may for example be a pram or stroller or a trolley such as a shopping trolley. The mounting part may be affixable to a handlebar of the movable object.

BRIEF DESCRIPTION OF THE DRAWINGS

The invention is further described by way of example only with reference to the accompanying drawings in which.

DETAILED DESCRIPTION OF THE PREFERRED EMBODIMENTS

Figure 1:
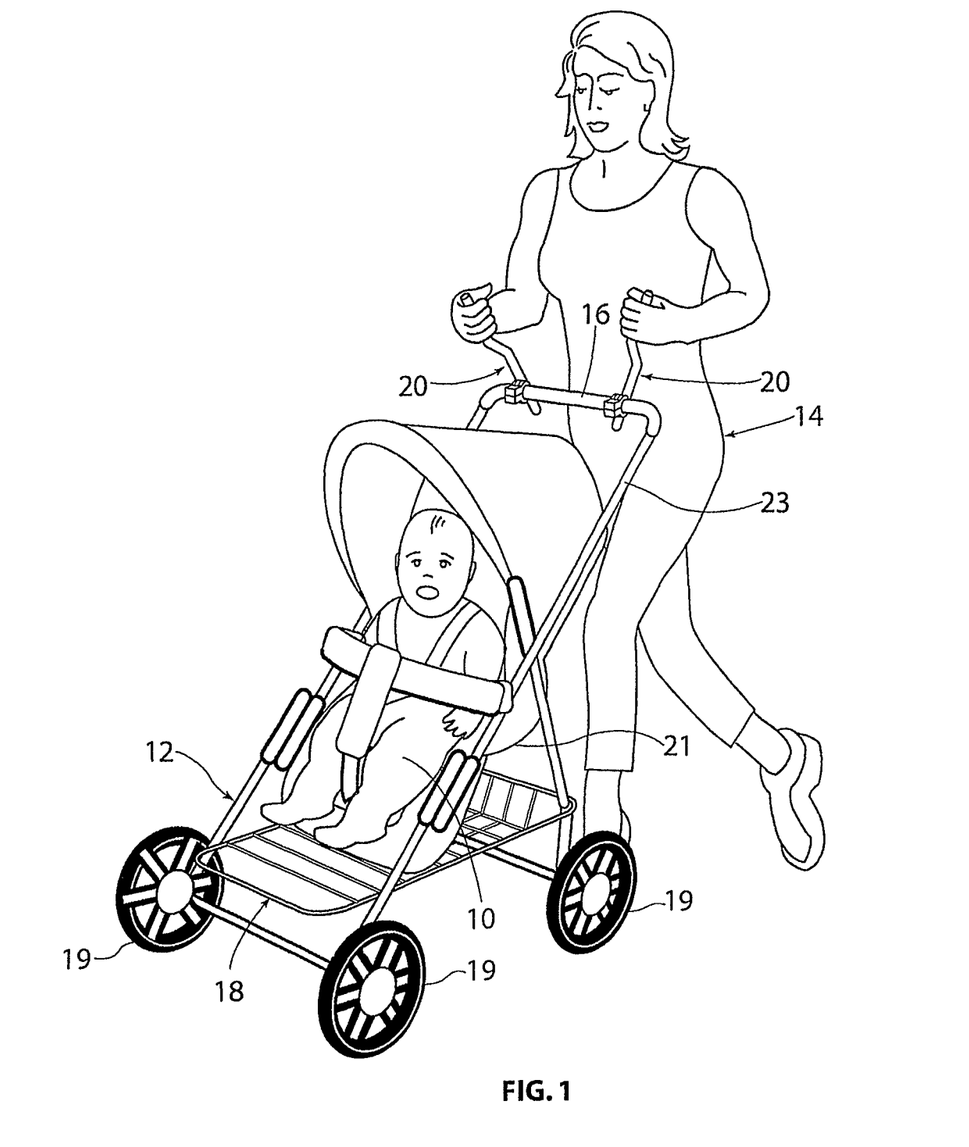
FIG. 1 is a perspective view of a stroller having two exercise devices constructed in accordance with the invention affixed thereto and being used by a person.

FIG. 1 shows an infant 10 in a wheeled stroller 12 being pushed by a person 14. Pushing is effected by the user by grasping two hand-graspable exercise devices 20 formed in accordance with the invention and fitted to the stroller 12.

The stroller 12 has a frame 18 with four ground wheels 19 (of which only three are visible in FIG. 1) a seat 21 for the infant and an upwardly and rearwardly extending pushing structure 23 including an upper transverse rear handlebar 16. The exercise devices 20 are fitted to the handlebar 16 of the stroller 12 and they are thus positioned at an upper rear location of the stroller 12.

The exercise devices 20 are alike, one exercise device 20 being shown in more detail in FIGS. 2-8. This exercise device 20 has a mounting part 25 in the form of a generally annular body 22 and a hand graspable movable part 24 mounted to body 22 for limited rotation with respect to the body 22 and the mounting part 25. Movable part 24 has a part-annular gripping part 26 mounted to the periphery of mounting part 25, and an arm part 28 fixed with respect to the gripping part 26.

Figure 2:
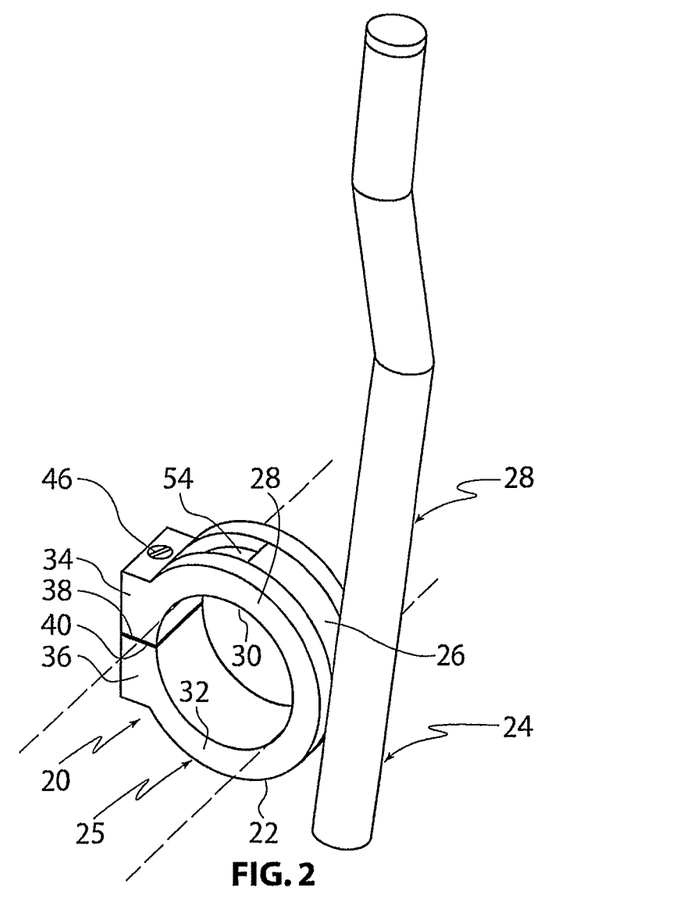
FIG. 2 is a perspective view of one exercise device shown in FIG. 1.

The body 22 is in the form of a split ring, having two opposed part circular arms 30, 32 extending from a common junction to free ends which carry respective lugs 34, 36. In the in-use condition of the device the lugs 34, 36 are positioned with opposed transverse surfaces 38, 40 thereof adjacent. The lugs 34, 36 have respective bores 42, 44 which in the in-use condition are aligned such that a screw 46 may be passed through the clearance bore 42 in lug 34 so as to be threadedly received in the threaded bore 44 in the other lug 36 so that the lugs are pulled towards each other by the screw to maintain the transverse surfaces 38, 40 in close proximity.

The arms 30, 32 are of trough-shaped transverse section (FIG. 8) having a base part 50 of rectangular form in transverse section, somewhat elongate in the axial direction of the body 22, and with opposed outstanding side flange portions 52. The base part 50 and flange portions 52 are each of part annular form and define therebetween an outwardly open part annular trough 54 extending from respective lugs 34, 36 around the remainder of the periphery of the body 22.

Figures 3, 4, 5:
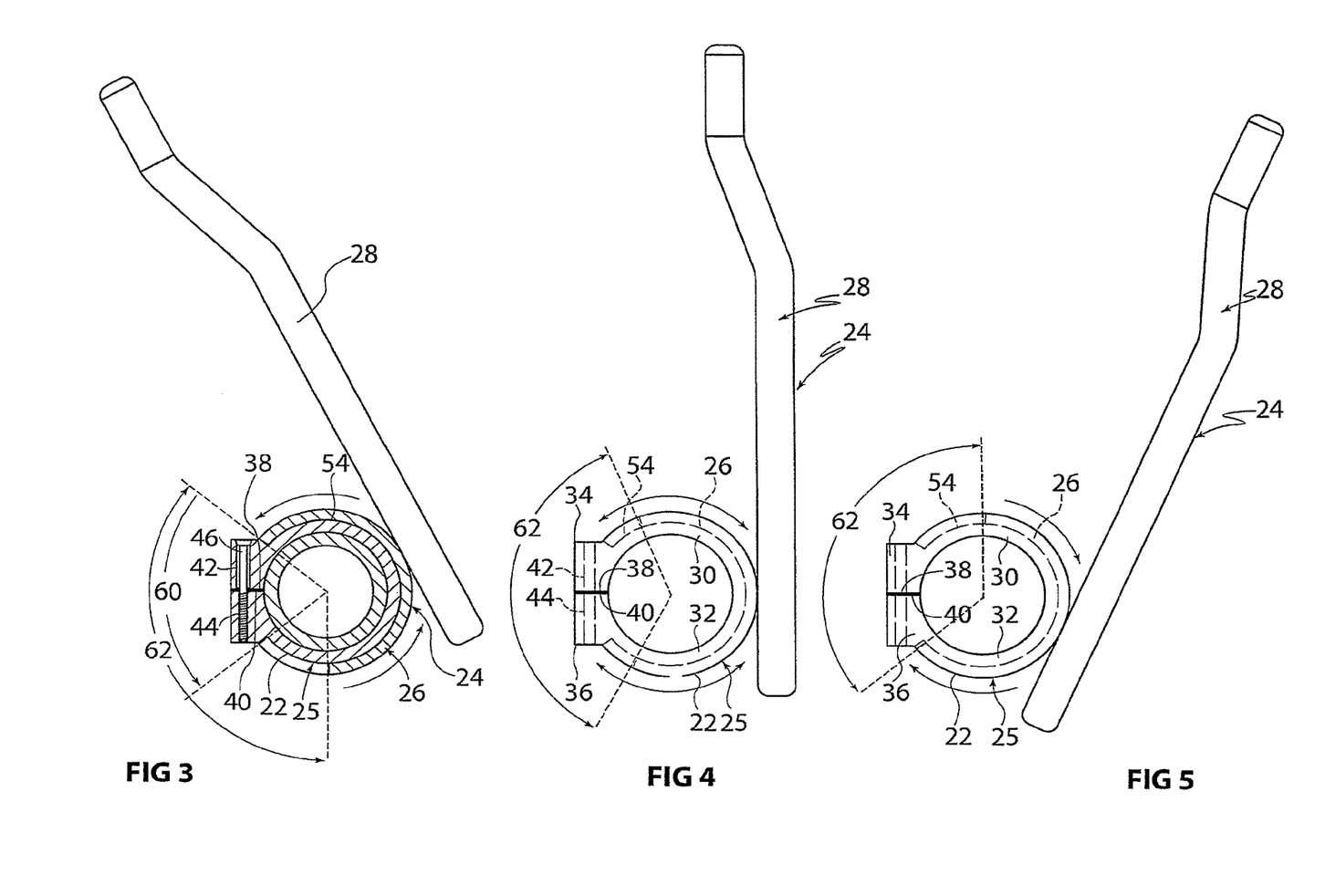
FIG. 3 is a partly transversely sectioned view of the device of FIG. 2 and of a handlebar to which the device is attached.
FIGS. 4 and 5 are side views of the device of FIG. 1, showing the device in two conditions, different to each other and to that prevailing in FIG. 3.
Figures 6, 7:
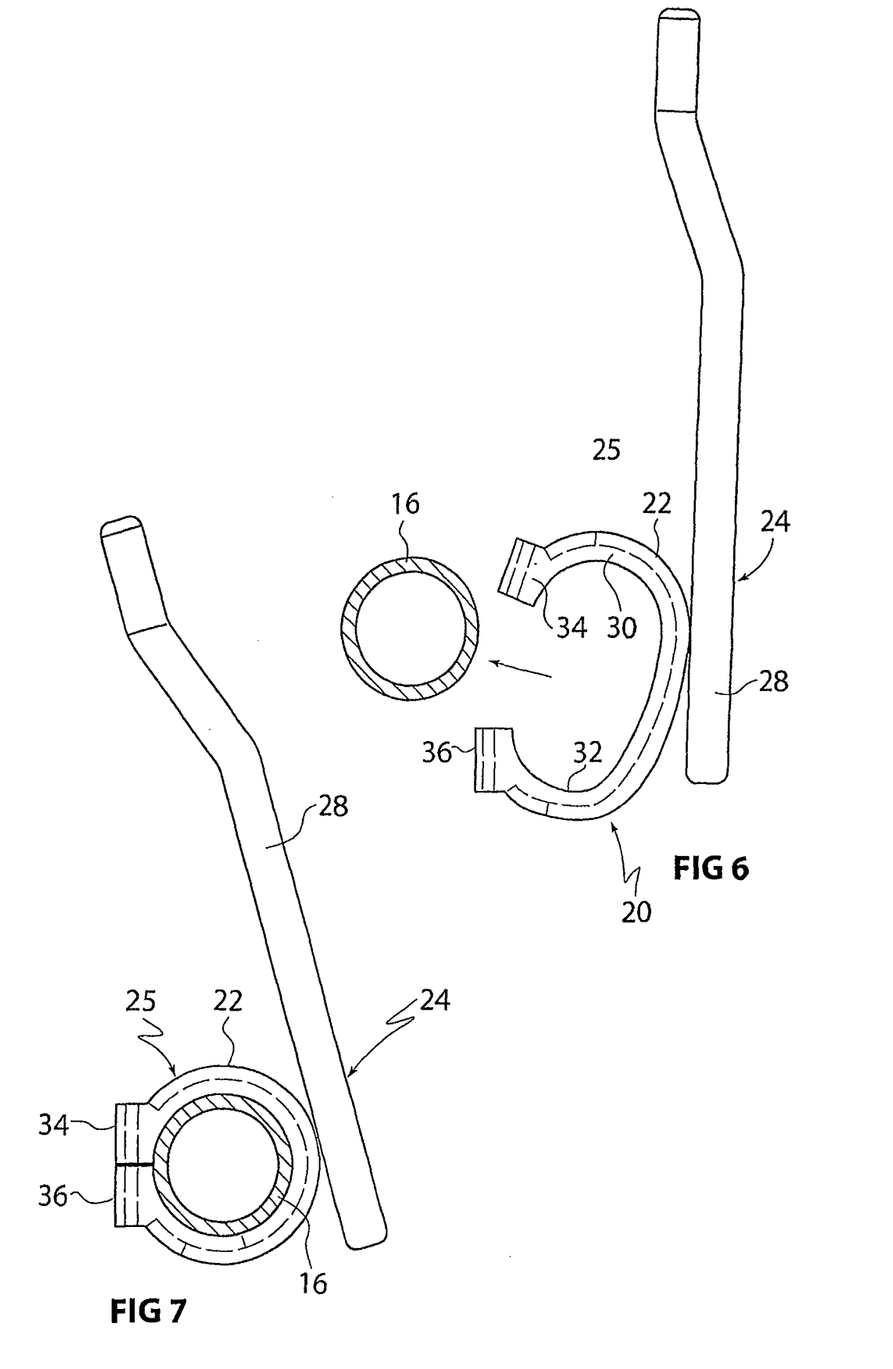
FIG. 6 is a side view of the device of FIG. 2 illustrating a step in mounting the device to a handlebar.
FIG. 7 is a side view of the device of FIG. 2, showing it positioned on a handlebar.

The gripping part 26 is of part annular form, and of rectangular cross-section complementary to that of the trough 54. The inner surface 56 of trough 54 is of part circular form in transverse cross-section substantially the same as the inner surface 58 of the gripping part 26, which is likewise part circular in transverse cross-section. Gripping part 26 is accommodated in trough 54. It resiliently grips the body 22, but is rotationally movable with respect to it about the common axis of body 22 and part 26. Particularly, the trough 54 of the body 22 extends about 285 degrees around the periphery of the body 22, leaving a gap 60 (FIG. 3) of about 80 degrees angular extent between the locations at which the trough terminates at each end adjacent respective lugs 34, 36. The gripping part, however, only extends a lesser peripheral distance within trough 54, about 240 degrees. That is the free ends of the gripping part 26 present a gap 62 (FIG. 3) of about 120 degrees extent. By this, the gripping part 26 is rotationally movable with respect to the body 22 over about 40 degrees of rotational movement, the extremes of movement being limited by engagement of the free ends of the gripping part with the lugs 34, 36, at respective ends of the trough 54, as shown in FIGS. 3 to 5.

The movable part 24 is fittable to the body 22 by resiliently deforming the gripping part 26 so as to spread the free ends of this such that the gap between them is sufficient to enable the body 22 to pass therethrough by relative transverse movement, after which the gripping part 26 is allowed to revert to its in use condition, with the body 22 captured in the trough 54 thereof. In the in-use condition, the gap 62 between the free ends of the gripping part 26 is substantially less than 180 degrees so that the interconnection between the body 22 and the movable part 24 is not readily disengageable in use of the device 20.

The arm part 28 may be formed, as shown, as an elongate element formed with or otherwise attached to the gripping part 26. In the position of the device 20 for use, the part 28 extends upwardly from the gripping part 26.

The device 20 is fittable to the handlebar 16 of the stroller 12, with the screw 46 removed, by resiliently deforming the arms 30, 32 so as to spread apart the arms at the lugs 34, 36 such that there is a sufficient gap between lugs to enable the handlebar 16 to pass into the interior of the body 22, after which the arms 30, 32 are allowed to resume their in-use condition with the handlebar 16 captured therewithin. After that, screw 46 is entered into the bores 42, 44 in the lugs 34, 36 and screwed up to draw the lugs together sufficiently to clamp the body 22 to the handlebar 16. By this, the device 20 is secured to the handlebars 16.

The rotational position of the body 22 with respect to the handlebar 16 can be selected in accordance with user preference, but it is generally sufficient that the arm extends upwardly from the handlebar, so as to be rotationally movable with respect to the stroller 12 over a range of about 20 degrees back and 20 degrees forward with respect to the vertical.

In use, the user may push the stroller 12 by grasping arm parts 28 and pushing these so as to transfer force to the handlebar 16 through the devices 20 at the same time manually executing back and forth movement of the arm parts 28 so as to execute user arm exercising motions.

Figure 10:
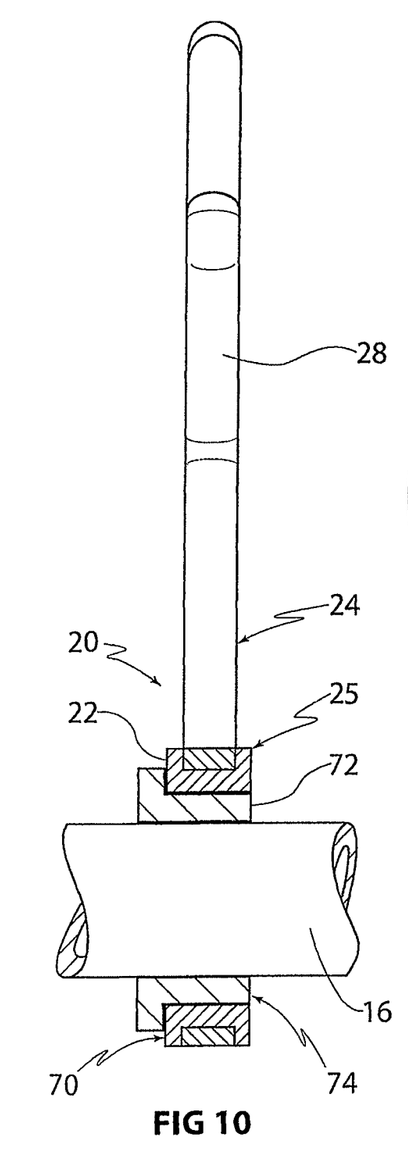
FIG. 10 is an axial section like FIG. 8 but showing the device of FIG. 2 mounted to a handlebar via an intermediate split sleeve.
Figure 11:
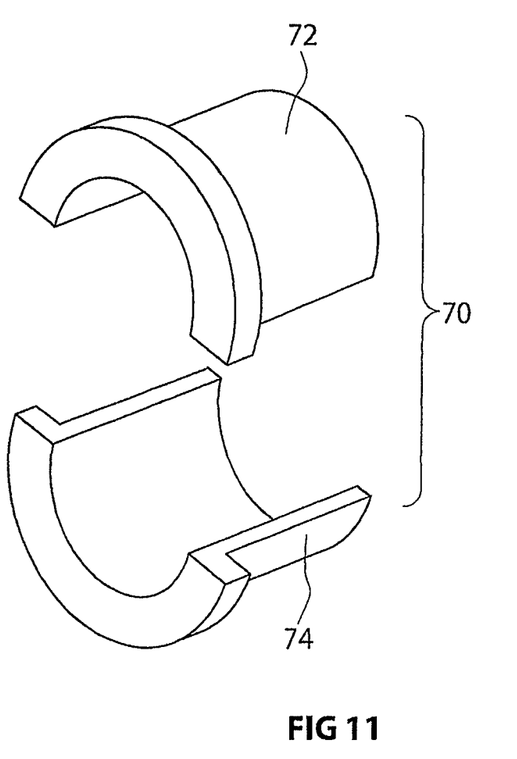
FIG. 11 is a perspective view of the split sleeve shown in FIG. 10.

In order to permit the device 20 to be satisfactorily attached to handlebars 16 of differing transverse dimensions, use may be made of one or more split rings. FIGS. 10 and 11 illustrate an exemplary split ring 70. This is in form of two half-cylindrical sections 72, 74 which fit together to form a tubular ring. The sections 72, 74 can be inserted over the handlebar 16 by lateral movement towards the handlebar 16 and the inner periphery of body 22 as shown in FIG. 11, so that the split ring 70 is accommodated between the body 22 and the handlebar 16, after which the device 20 may be attached over the split ring in the manner previously described.

Generally, the engagement between the body 22 and gripping part 26 may be relatively free, but affording some frictional resistance to relative rotational movement. For example, the frictional coupling between body 22 and gripping part 26 may be such that the arm part 28 will remain in upright positions, if left, without dropping. The frictional coupling may be provided for by appropriately selecting the resilience of the gripping part 26 and possibly making this such that, in the rest position of the gripping part 26, the inside transverse dimension of the gripping part 26 is, at least at free ends of the gripping part, slightly smaller than the diameter of the trough 54 at its inner surface 58.

Figures 8, 9:
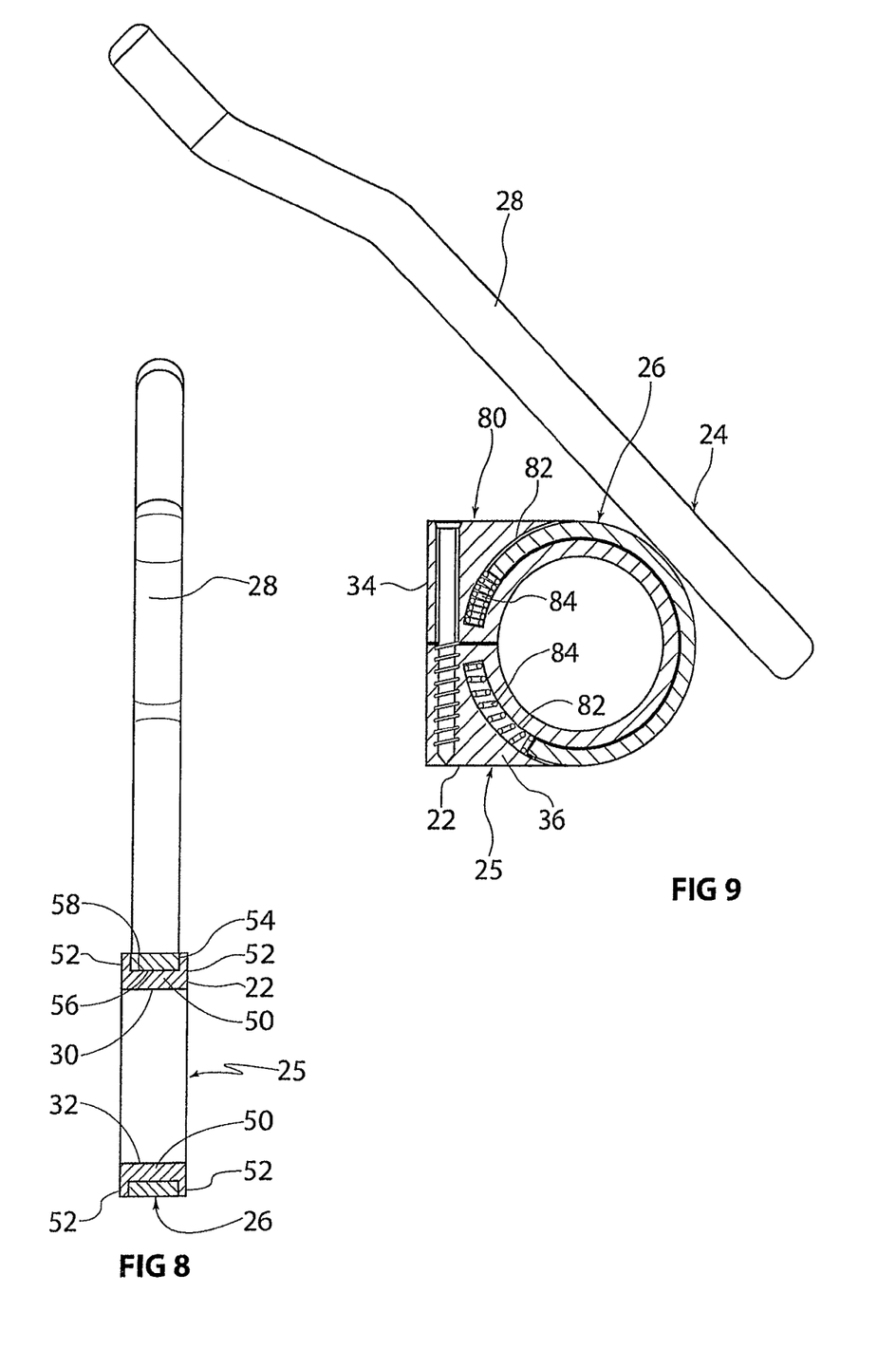
FIG. 8 is an axial-cross section of the device of FIG. 2.
FIG. 9 is a transverse cross-section of a modified device of the invention, fitted to a handlebar.

The resistance to relative movement between the body 22 and movable part 24 may however be provided otherwise. For example FIG. 9 shows a modified exercise device 80. Like reference numerals denote like parts in FIGS. 1 to 8 and in FIG. 11, and the following explanation is confirmed to the differences between the exercise device 20 and the exercise device 80.

In the device 80, lugs 34, 36 are made somewhat larger and present part circular passages 82 constituting extensions of the trough 54 into the lugs and within which the free ends of gripping part 26 are respectively accommodated. Helical compression springs 84 are provided between the free ends of the gripping part and blind inner ends of the passages 82 to resiliently act against these ends. The springs, in the rest position, are balanced such that the movable part 24 is resiliently biased to an intermediate rest position e.g. corresponding to that of FIG. 4. However, by the user applying rotational force act against the resilient bias of the springs 84 it is possible for the user to execute reciprocatory movements of the movable part 24 with respect to the body 22.

The mounting part 25 and the movable part 24 may be formed of any suitable material, such as plastics. In the described form, each of these parts is sufficiently resilient to enable deformation thereof to permit fitting of the movable part 24 to mounting part 25 and to permit fitting of the device 20 to the handlebar 16. However, either or both these parts may be formed from, e.g. rigid material. In such that case, the body part 22 may be formed as two completely separable parts. For example, body part 22 may be formed as two half-circular separable parts connectable together by, e.g. two screws passing through respective pairs of lugs like lugs 34, 36. The gripping part 26 may be also formed with at least part of the gripping part releasably detachable.

Also, while it is convenient to provide a clamping connection between the lugs 34, 36 by means of the described screw 46, interconnection may be provided by other means, such as a snap-fastener, which may have co-operating latching components respectively attached to or formed with the lugs 34, 36.

Figure 12:
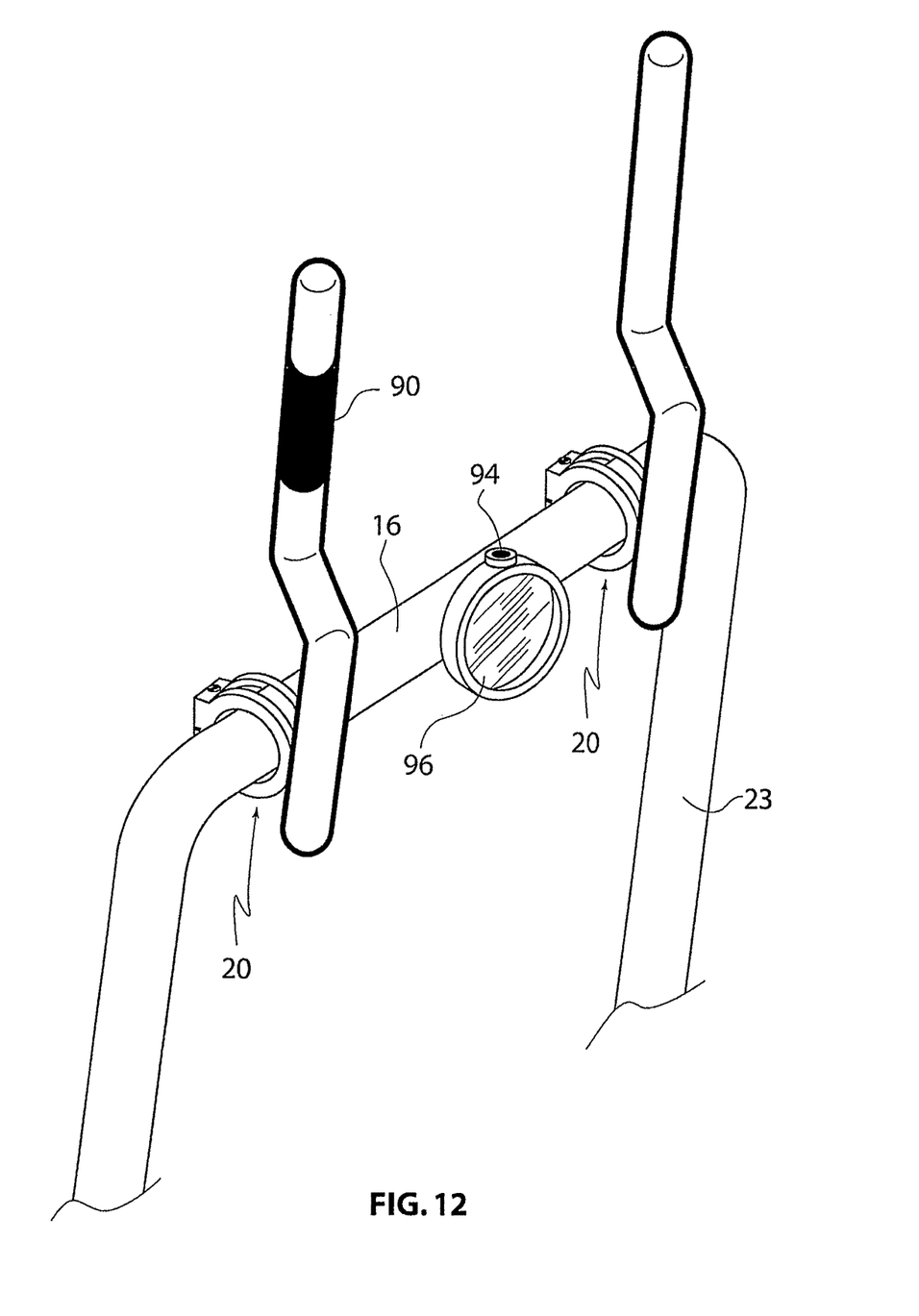
FIG. 12 is a fragmentary perspective view of a modified exercise device formed in accordance with the invention, fitted to a stroller.

FIG. 12 shows another modification of the invention. In this case, the arm part 28 of one of the devices 20 is fitted toward its free end with a sensor 90 which is grasped by one hand of the user when using that device 20. Sensor 90 is arranged for wireless (e.g. Bluetooth) communication of data to a computerized data manipulation and visual display device, 94 having a visual display screen 96. The device 94 may for example be secured by any suitable means to handlebar 16 as shown. Sensor 90 is responsive to touch by the user to generate data about the user which is transferred wirelessly to device 94. For example, the sensor 90 may sense user pulse rate, blood pressure or the like, or calculate energy expenditure (calorie count). The data is visually displayed device on display 94 which is positioned with its screen located for viewing by the user while exercising using the device 20.

The device 20 is suitable for use with movable objects other than the described stroller 12. For example, it may be used with a pram or a supermarket trolley or other shopping trolley, or similarly configured objects. While it is considered best to have two devices 20 attached to the object, for exercising both arms of a user, of course only one device may be fitted. Also, while the device 20 is suitable for use in pushing an object, it can also be used in pulling an object such as for example a wheelbarrow. In an alternative embodiment, the mounting part 25 forms part of the movable object. For example, it may be directly formed with the handlebar 16.

The described construction has been advanced merely by way of example and many modifications and variations may be made without departing from the spirit and scope of the invention, which includes every novel feature and combination of features herein disclosed.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge.

The invention claimed is:

1. An exercise device comprising:
a mounting part comprising circular passages; and
a hand graspable movable part mounted to the mounting part for movement with respect to the mounting part along rotational path defined by said circular passages, the mounting part being affixable to a hand movable object so that the hand movable object may be moved by a user by hand grasping the hand graspable movable part while also executing reciprocatory movement of the hand graspable movable part,
wherein helical compression springs are provided within said circular passages to bias the hand graspable movable part to an intermediate rest position and are positioned to be axially compressed to resiliently oppose rotational movement of the hand graspable movable part, under movement of the hand graspable movable part with respect to the mounting part, in either rotational direction away from the intermediate rest position, and
wherein the hand graspable movable part is retained within said circular passages during said rotational movement and rotation of the hand graspable movable part is limited in opposite directions by engagement of respective ends of the hand graspable movable part with the mounting part.

2. The device of claim 1 further comprising a handlebar,
wherein the mounting part is in the form of an annular body split to enable the annular body to be deformed to open for the handlebar to pass transversely into the annular body so that the handlebar is accommodated within the annular body, parts of the body configured to be drawn together by a fastener to clamp the body around the handlebar.

3. The device of claim 1 wherein the hand graspable movable part has an arm part for gripping by a user.

4. A hand movable object having attached thereto a device as claimed in claim 1.

5. A hand movable object as claimed in claim 4 in the form of a wheeled object.

6. A hand movable object as claimed in claim 5 wherein the wheeled object is a pram, a stroller or a shopping trolley.

7. A hand movable object comprising:
a hand graspable movable part movable with respect to the hand movable object so that the hand movable object may be moved by a user by hand grasping the hand graspable movable part while also executing reciprocatory movement of the hand graspable movable part;
a mounting part in the form of an annular body comprising circular passages configured to define a rotational path for movement of the hand graspable movable part with respect to the mounting part; and
a fastener for drawing parts of the body together to secure the annular body around the hand movable object,
wherein helical compression springs are provided within the circular passages to bias the hand graspable movable part to an intermediate rest position and are positioned to be axially compressed to resiliently oppose rotational movement of the hand graspable movable part, under movement of the hand graspable movable part with respect to the mounting part, in either rotational direction away from the intermediate rest position, and
wherein a circular part of the hand graspable movable part is retained within said circular passages during said rotational movement and rotation of the hand graspable movable part is limited in opposite directions by engagement of respective ends of the hand graspable movable part with the mounting part.

8. The device of claim 1 further comprising a sensor for sensing user pulse rate, blood pressure or energy expenditure.

9. A hand movable object as claimed in claim 7 in the form of a wheeled object.

10. A hand movable object as claimed in claim 9 wherein the wheeled object is a pram, a stroller or a shopping trolley.

11. The device of claim 7 wherein the hand graspable movable part has an arm part for gripping by a user.

12. The device of claim 7 further comprising a sensor for sensing user pulse rate, blood pressure or energy expenditure; and
a display screen,
wherein the sensor wirelessly communicates with the display screen, and data from the sensor is visually displayed on the display screen.

13. An exercise device comprising:
a mounting part comprising circular passages;
a hand graspable movable part mounted to the mounting part for movement with respect to the mounting part along a rotational path defined by said circular passages, the mounting part being affixable to a hand movable object so that the hand movable object may be moved by a user by hand grasping the hand graspable movable part while also executing reciprocatory movement of the hand graspable movable part; and
a handlebar,
wherein helical compression springs are provided within said circular passages to bias the hand graspable movable part to an intermediate position and are positioned to be axially compressed to resiliently oppose rotational movement of the hand graspable movable part, under movement of the hand graspable movable part with respect to the mounting part, in either rotational direction away from the intermediate rest position, and
wherein the mounting part is in the form of an annular body split to enable the annular body to open for the handlebar to pass transversely into the annular body so that the handlebar is accommodated within the annular body, parts of the annular body are configured to be drawn together by a fastener to clamp the body around the handlebar, and the hand graspable movable part is engaged with a curved surface of the annular body for rotational movement around an axis defined by the handlebar.

* * * * *